United States Patent
Carlson, III

(10) Patent No.: US 6,638,139 B2
(45) Date of Patent: Oct. 28, 2003

(54) MULTI-SPINDLE END EFFECTOR

(75) Inventor: Glen A. Carlson, III, Birmingham, MI (US)

(73) Assignee: Acme Manufacturing Company, Auburn Hills, MI (US)

( * ) Notice: Subject to any disclaimer, the term of this patent is extended or adjusted under 35 U.S.C. 154(b) by 21 days.

(21) Appl. No.: 10/087,293

(22) Filed: Feb. 28, 2002

(65) Prior Publication Data

US 2002/0173226 A1 Nov. 21, 2002

Related U.S. Application Data

(60) Provisional application No. 60/292,240, filed on May 18, 2001.

(51) Int. Cl.[7] .............................................. B24B 49/00
(52) U.S. Cl. ............................ 451/5; 451/299; 451/247; 451/397
(58) Field of Search ......................... 451/5, 247, 283, 451/299, 397, 401, 402, 403

(56) References Cited

U.S. PATENT DOCUMENTS

| | | | | |
|---|---|---|---|---|
| 3,828,479 A | * | 8/1974 | Highberg et al. ............. 125/20 |
| 4,187,644 A | * | 2/1980 | Fitzpatrick .................. 451/151 |
| 4,422,265 A | * | 12/1983 | Branston ..................... 409/158 |
| 4,439,951 A | * | 4/1984 | Oppelt et al. ................ 451/194 |
| 4,471,577 A | * | 9/1984 | Ogawa et al. ............... 451/401 |
| 4,660,328 A | * | 4/1987 | Boman ........................ 451/340 |
| 4,753,045 A | * | 6/1988 | Fetouh et al. ............... 451/261 |
| 4,782,567 A | * | 11/1988 | Kanaya et al. .............. 29/33 P |
| 5,174,071 A | * | 12/1992 | Tommasini .................. 451/332 |
| 5,697,831 A | * | 12/1997 | Reichel ....................... 451/121 |
| 5,857,901 A | * | 1/1999 | LaPoint ....................... 451/113 |
| 6,039,634 A | * | 3/2000 | Bach et al. .................... 451/49 |
| 6,250,999 B1 | * | 6/2001 | Pineau et al. ............... 451/362 |
| 6,271,140 B1 | * | 8/2001 | Chang ......................... 438/692 |

* cited by examiner

Primary Examiner—M. Rachuba
(74) Attorney, Agent, or Firm—Harness, Dickey & Pierce, P.L.C.

(57) ABSTRACT

A multi-spindle end effector is provided for a multiple axis robot. The multi-spindle end effector includes a plate housing having at least a pair of spaced-apart spindles mounted thereon. A servo-motor drivingly engages the spindles. A gear box steps down the RPMs of the motor to the desired RPM of the object to be rotated. A timing belt, which may be continuous, interlinks the first and second spindles so that the rotation of first spindle matches the rotation of the second spindle. An idler pulley may be employed to properly tension the belt.

19 Claims, 9 Drawing Sheets

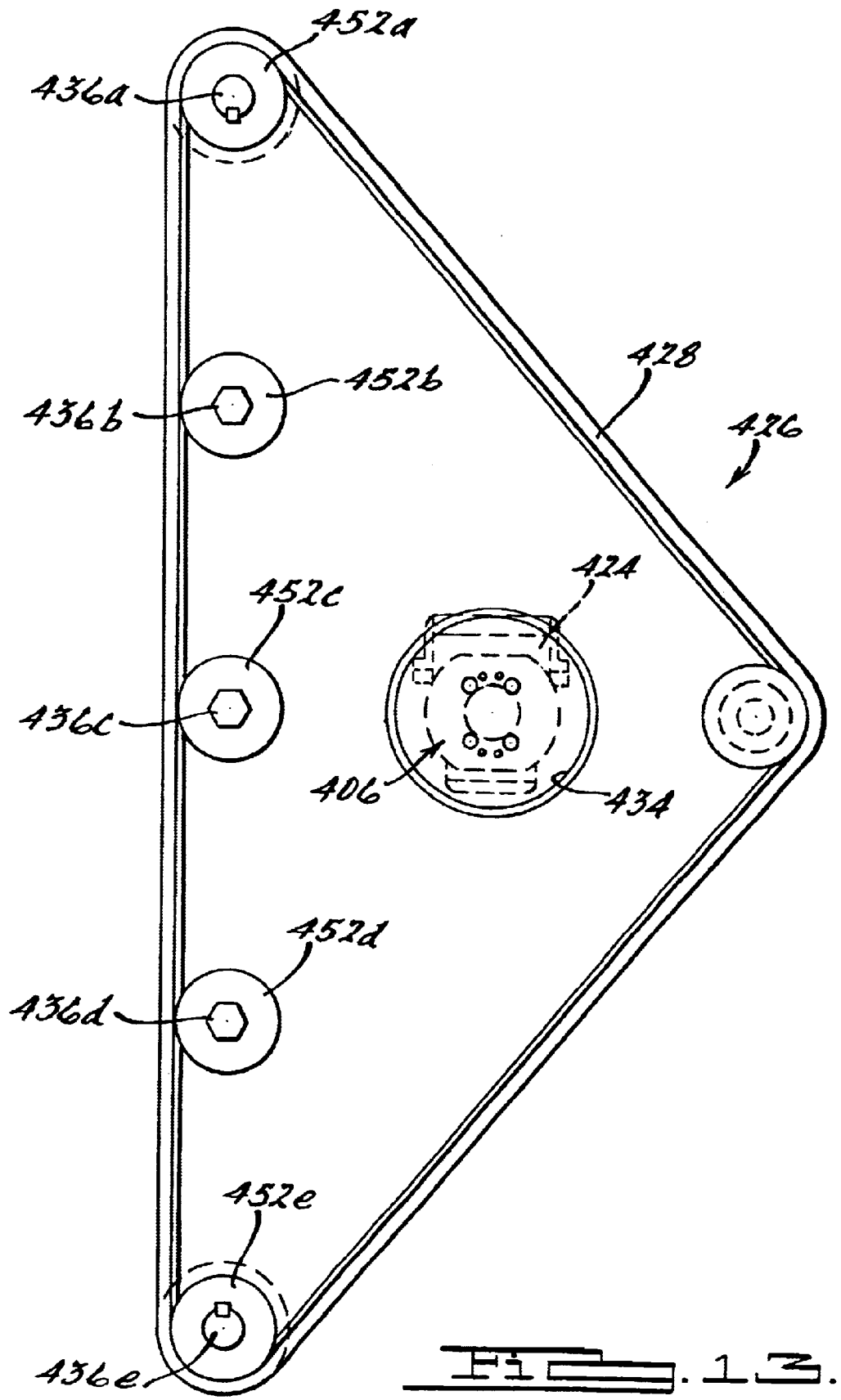

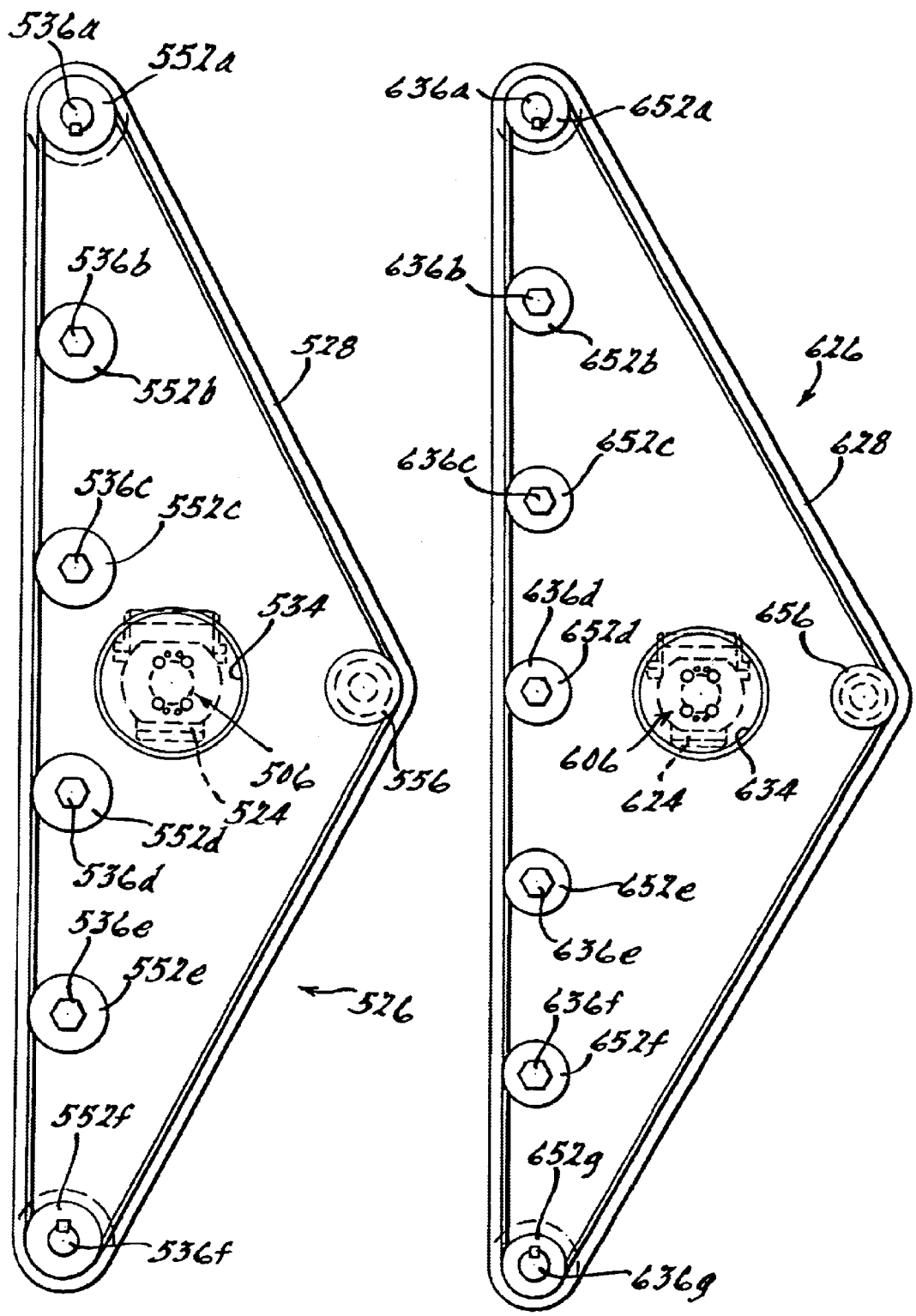

MULTI-SPINDLE END EFFECTOR

CROSS REFERENCE TO RELATED APPLICATIONS

This application claims the benefit of U.S. Provisional Application No. 60/292,240 filed May 18, 2001. The disclosure of the above application is incorporated herein by reference.

BACKGROUND OF THE INVENTION

1. Technical Field

The present invention generally relates to end effectors for robotic units and, more particularly, to a multi-spindle end effector for rotatably supporting multiple objects to be rotated.

2. Discussion

Many objects of manufacture require deburring, grinding, buffing and/or polishing prior to being deemed acceptable as a finished product. For example, many chrome parts, such as wheels for automotive vehicles, motorcycle parts, and plumbing and lock hardware, require such buffing and polishing. Manual performance of these tasks is difficult and labor intensive.

To expedite the processing of such articles of manufacture, automated polishing and buffing is sometimes employed. To date, the most successful technique for polishing and buffing through an automated mechanism involves the use of a six axis robot which positions the object of manufacture adjacent polishing and/or buffing wheels. A six axis robot is particularly well-suited for this purpose since it can be programmed to move from a staging area where a worker loads the object of manufacture onto the sixth axis mounting surface of the robot. Thereafter, the robot moves the object of manufacturer away from the staging area to a work area where buffing and polishing are performed.

While such six axis robots have provided a vast improvement over manual polishing and/or buffing, there is still room for improvement in the art. For example, conventional buffing and polishing robots are limited to manipulation of one object of manufacture at a time. This limits production capacity.

In view of the foregoing, it would be desirable to provide an automated mechanism for simultaneously processing a plurality of objects of manufacture.

SUMMARY OF THE INVENTION

The above and other objects are provided by a multi-spindle end effector for a six axis robot. The multi-spindle end effector includes a plate housing having at least a pair of spaced-apart spindles mounted thereon. A servo-motor drivingly engages the spindles. A gear box steps down the RPMs of the motor to the desired RPM of the object to be rotated. A timing belt, which may be continuous, interlinks the first and second spindles so that the rotation of first spindle matches the rotation of the second spindle. An idler pulley may be employed to properly tension the belt.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 4 is a plan view of the multi-spindle end effector of the present invention;

FIG. 13 is a plan view of a fourth embodiment multi-spindle end effector of the present invention;

FIG. 14 is a plan view of a fifth embodiment multi-spindle end effector of the present invention; and FIG. 15 is a plan view of a sixth embodiment multi-spindle end effector of the present invention.

DETAILED DESCRIPTION OF THE PREFERRED EMBODIMENTS

The following description of the preferred embodiments is merely exemplary in nature and is in no way intended to limit the invention, its application, or uses.

The present invention is directed toward a multi-spindle end effector for a six axis robot. The multi-spindle end effector enables a plurality of objects of manufacture, such as wheels, motorcycle parts, plumbing fixtures, and builders and lock hardware to be simultaneously processed. For example, the multi-spindle end effector of the present invention is well suited to simultaneously rotate a pair of wheels for buffing and polishing.

Figures 1, 5:
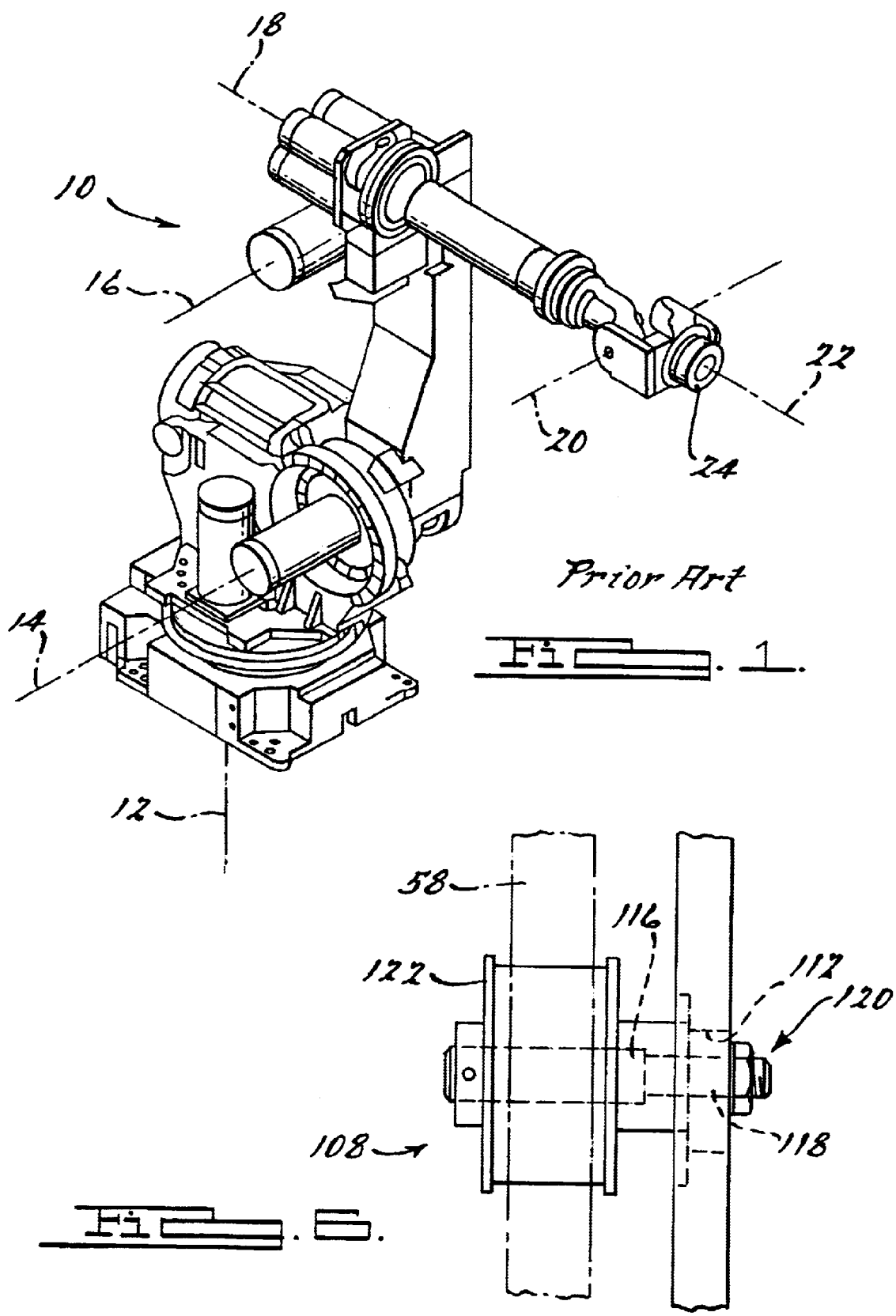
FIG. 1 is a perspective view of a six axis robot suitable for working in conjunction with the multi-spindle end effector of the present invention.
FIG. 5 is a front view of the sixth axis mounting surface of the robot illustrated in FIG. 1.

Turning now to the drawing figures, FIG. 1 illustrates a six axis robot 10 suitable for use in conjunction with the multi-spindle end effector of the present invention. Although other multi-axis robots may be suitable for use herein, it is presently preferred to employ a FANUC Robotics S-430iW robot (165 Kg). This robot operates well in confined spaces and can handle the payload of the end effector. If a greater payload is required, other robots may be used such as FANUC Robotics R2000 (200 kg) or 5900 (400 kg).

The robot 10 includes a first axis of movement 12, second axis of movement 14, a third axis of movement 16, a fourth axis of movement 18, a fifth axis of movement 20, and a sixth axis of movement 22. The sixth axis of movement 22 enables a wrist 24 of the robot 10 to rotate while the fifth axis of movement 20 enables the wrist 24 to pivot. These ranges of motion are beneficial for manipulating the end effector as described below.

Figure 2:
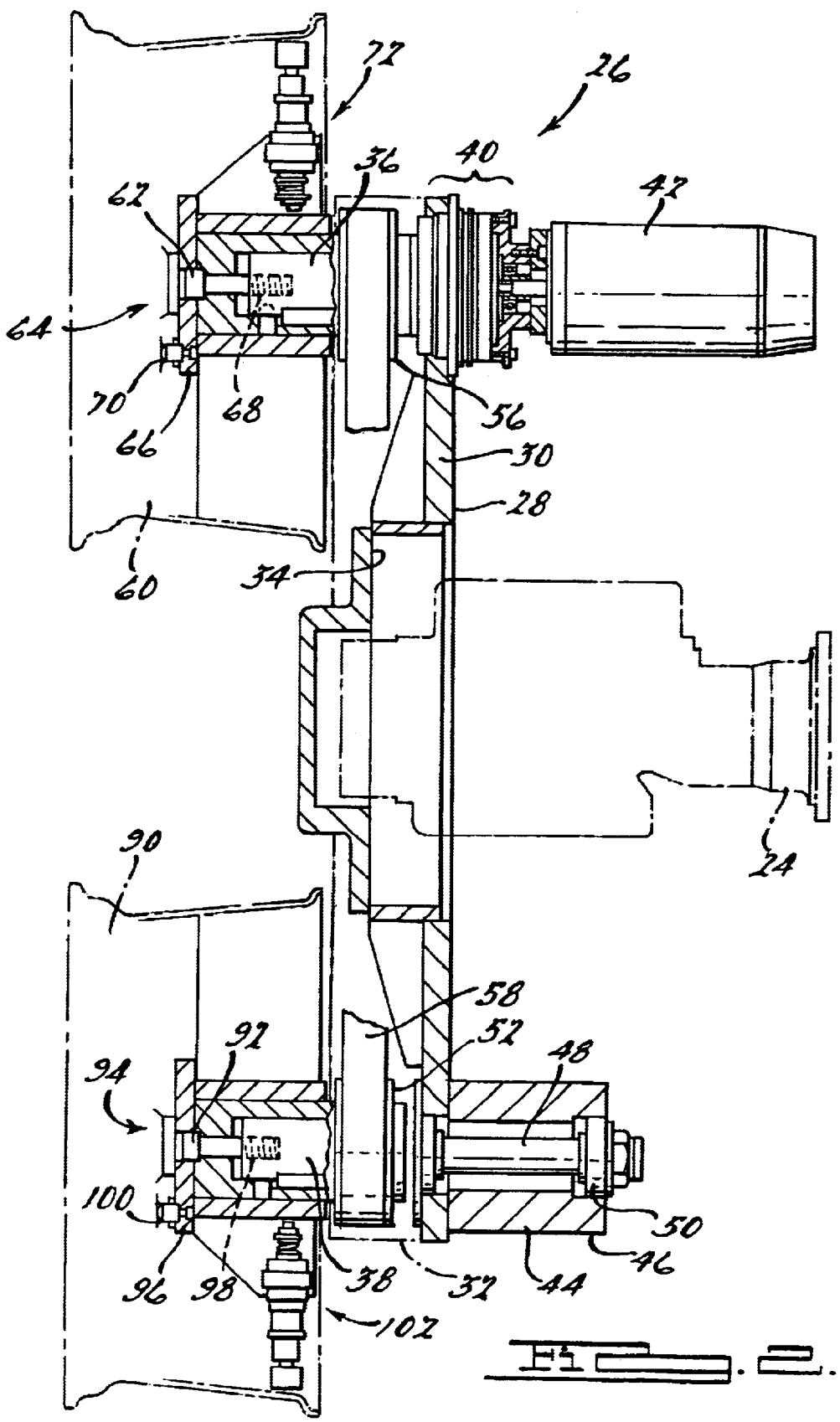
FIG. 2 is a side view of the multiple spindle end effector of the present invention.

Turning now to FIG. 2, an end effector assembly 26 is illustrated coupled to the wrist 24 of the robot 10 illustrated in FIG. 1. The end effector 26 includes a plate housing 28 which is preferably formed as an aluminum weldment to minimize weight without sacrificing strength. The plate housing 28 includes a base 30 surrounded by an integrally formed annular rib 32 (shown in phantom). The annular rib 32 stiffens the plate housing 28 while minimizing additional weight.

The base 30 includes a centralized recessed portion 34 where the end effector 26 is fixedly secured, e.g., bolted, to the wrist 24. The recessed portion 34 positions the center of gravity of the end effector 26 axially away from the distal end of the wrist 24. This saves wear and tear on the robot 10 (FIG. 1).

The plate housing 28 rotatably supports a laterally projecting first spindle 36 at one end and a laterally projecting second spindle 38 at an opposite end. Preferably, the first spindle 36 and second spindle 38 are formed of aluminum to minimize weight without sacrificing strength. The first and second spindles 36 and 38 preferably project parallel to one another and are spaced apart by a sufficient amount to ensure clearance of the objects of manufacture to be mounted thereto. For example, the preferred embodiment of the present invention can rotatably support a pair of vehicle wheels having diameters ranging from thirteen to twenty-six inches or a wide range of other parts such as motorcycle and plumbing fixtures.

The first spindle 36 is drivingly connected to one end of a gear box 40 mounted to the plate housing 28. A second end of the gear box 40 is drivenly connected to a drive shaft of a servo-motor 42. As such, rotation of the drive shaft of the servo-motor 42 is transferred through the gear box 40 to the first spindle 36.

The servo-motor 42 provides a seventh axis of rotation for the robot 10 (FIG. 1). To minimize the weight extending beyond the end of the wrist 24, the servo-motor 42 preferably extends opposite the first spindle 36 relative to the plate housing 28. Although other motors may be suitable for use herein, it is presently preferred to employ a Fanuc Alpha 6/3000 motor. Larger motors may also be used. A 1.9 HP version of this motor preferably includes a straight drive shaft and a brake and has a speed of up to 3000 RPMs. The motor 42 is controllable to start and stop, index, "free wheel", or reverse the objects coupled thereto.

The gear box 40 reduces the RPMs of the motor 42 transferred to the first spindle 36. While different articles of manufacture require different RPMs depending on their final processing needs, it is presently preferred to reduce the RPMs of the first spindle 36 to a range of between 0 and 50 RPMs. Although other gear boxes may be suitable for use herein, it is presently preferred to employ an Alpha Gear TP 050 Gearhead reducer. Variant 1 of this two stage gearbox preferably has a reduction ratio of about 61:1.

The second spindle 38 is rotatably supported relative to the plate housing 28 by a spindle housing 44. To minimize the weight extending beyond the end of the wrist 24, the spindle housing 44 preferably extends opposite the second spindle 38 relative to the plate housing 28. The spindle housing 44 includes a shroud 46 and a shaft 48 rotatably supported by a pair of steel bearings 50. A driven pulley 52 (described below) is non-rotatably secured, e.g., splined, to the shaft 48.

A driving pulley 56 is non-rotatably connected, e.g., splined, to the first spindle 36. A synchronizer in the form of a timing belt 58 meshingly engages the driving pulley 56 and driven pulley 52 such that they are interconnected. The belt 58 preferably consists of rubber and includes teeth distributed thereabout. The belt 58 transfers the rotation of the first spindle 36 by the motor 42 (and gear box 40) to the second spindle 38 at a one-to-one ratio such that the rotation of the spindles 36 and 38, as well as the objects of manufacture mounted thereto, is matched. To save weight, the driving pulley 56 and driven pulley 52 are preferably formed of aluminum.

A first object of manufacture in the form of an aluminum wheel 60 is non-rotatably connected to the first spindle 36 by a first pin 62. The first pin 62 passes through a central orifice 64 in a locator plate 66 and frictionally wedges within an axial bore 68 of the first spindle 36. A locating/indexing member 70 interengages the locator plate 66 and the wheel 60 to ensure that the wheel 60 adopts a pre-selected orientation when mounted to the end effector 26. Preferably, different locator plates are employed depending upon the configuration of the object of manufacture to be secured to the end effector 26. For example, complimentary bolt patterns should be ensured.

Figure 3:
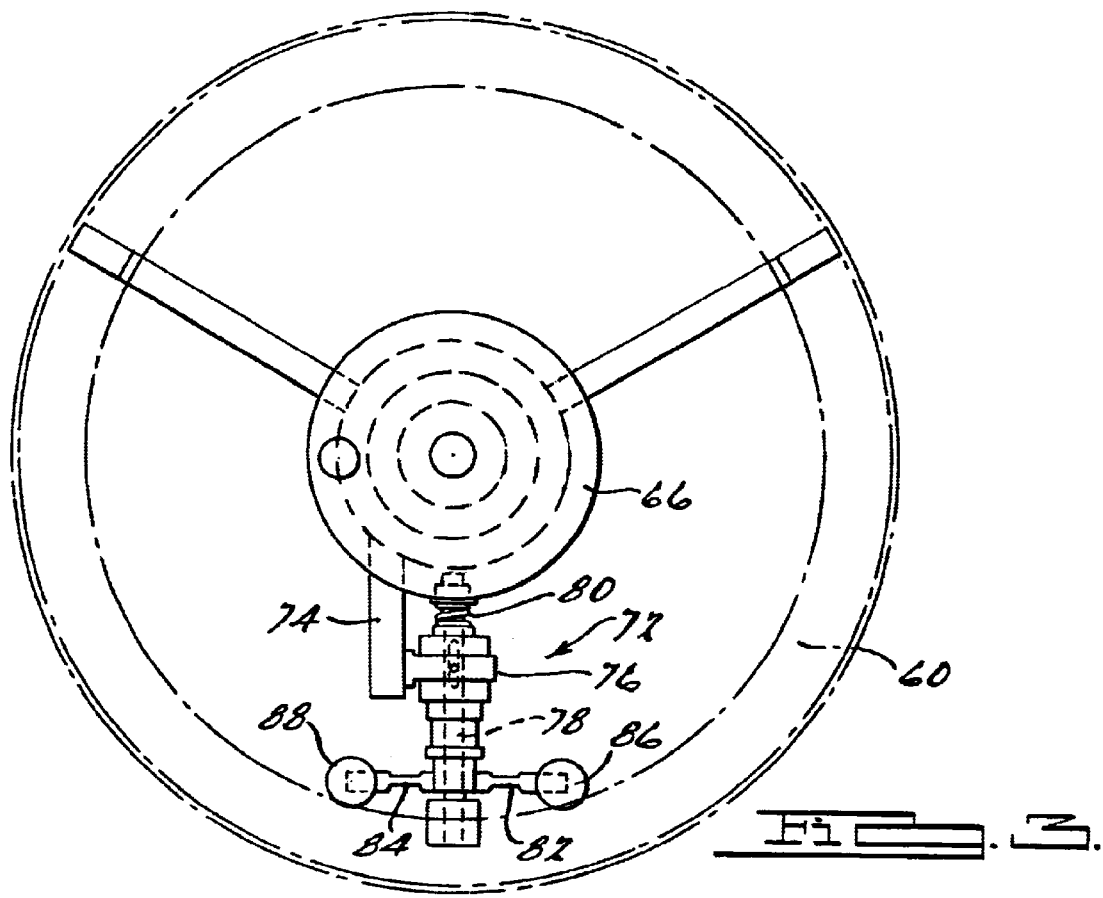
FIG. 3 is a plan view of a wheel mounting mechanism of the end effector of the present invention.
Figure 5:
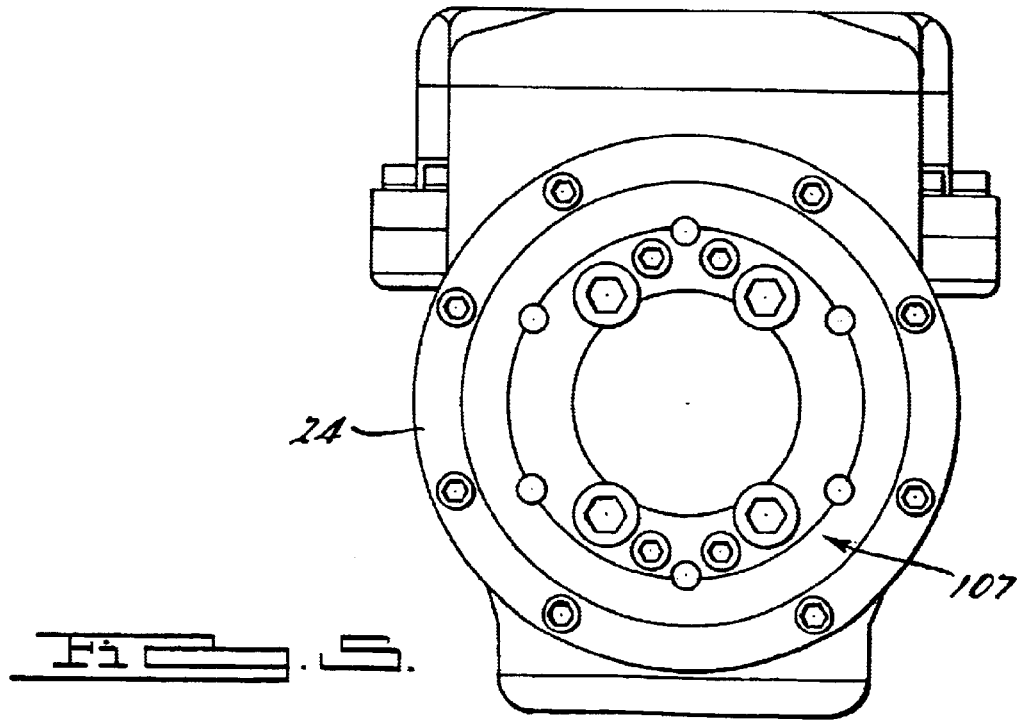

A wheel holder assembly 72 further secures the wheel 60 to the first spindle 36. Referring now to FIG. 3, a detailed illustration of the wheel holder assembly 72 is illustrated. If another object of manufacture was to be supported on the end effector, the wheel holder assembly 72 may not be necessary.

The wheel holder assembly 72 includes a support arm 74 mounted to the locator plate 66. The support arm 74 includes a support 76 slidably supporting a radially extending piston 78. The piston 78 is biased in an outboard direction by a biasing member in the form of a spring 80. A moveable arm 82 laterally extends from a free end of the piston 78. In a first position, the distal end 86 of the arm abuttingly engages an edge of the wheel 60 to secure it in place while being processed. In a second position, the wheel 60 can be removed.

Referring again to FIG. 2, a second object of manufacture in the form of a wheel 90 is mounted to the second spindle 38. A second pin 92 passes through a central orifice 94 in a locator plate 96 and frictionally wedges within an axial bore 98 of the second spindle 38. A locating/indexing member 100 interengages the locator plate 96 and the wheel 90 to ensure that the wheel 90 adopts a pre-selected orientation (i.e., matching that of the first wheel 60) when mounted to the end effector 26. A wheel holder assembly 102, which is preferably identical to the wheel holder 72 described above, further supports the wheel 90 relative to the second spindle 38.

Turning now to FIG. 4, a front view of the end effector 26 is illustrated. The plate housing 28 is generally shaped as an offset diamond and includes a plurality of elongated ribs 104 for added strength. The plate housing 28 also includes a plurality of mounting holes, generally shown at 106, in the recessed portion 34 for accommodating fasteners such as bolts to secure the end effector 26 to the wrist 24 of the robot 10 (FIG. 1).

Referring to FIG. 5, the wrist 24 has a pre-selected bolt pattern 107 to which the mounting holes 106 (FIG. 4) are designed to match.

Referring again to FIG. 4, a pair of idler pulleys 108 and 110 are rotatably and slidably mounted to a pair of slots 112 and 114 formed in the base 30 of the end effector 26. By selectively positioning the pair of idler pulleys 108 and 110 along their respective slots 112 and 114, the tension of the belt 58, which synchronizes the rotation of the first wheel 60 and second wheel 90, is controlled. Maintaining proper tensioning on the belt 58 prevents belt slippage to ensure that the wheels 60 and 90 rotate in phase.

Figure 6:
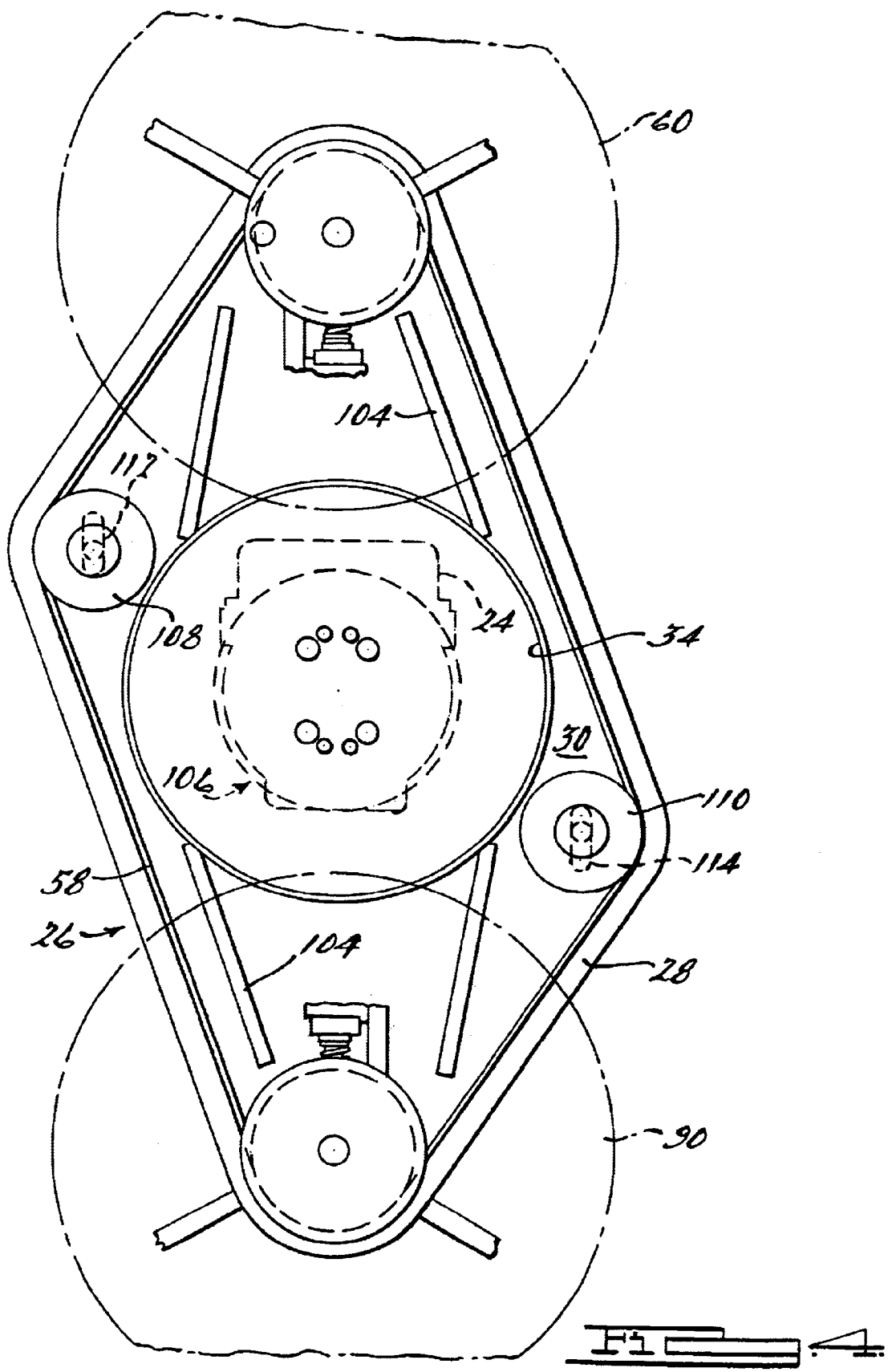
FIG. 6 is a side view of an idler pulley of the end effector of the present invention.

Turning to FIG. 6, the idler pulley 108 is illustrated in greater detail. Although only idler pulley 108 is illustrated, the idler pulley 110 (FIG. 4) is preferably identical thereto. The idler pulley 108 includes a sleeve 116 rotatably mounted on a shaft 118 of a jam nut 120. An aluminum pulley wheel 122 is coupled to the sleeve 116 and accommodates the belt 58. The jam nut 120 is selectively positionable along the slot 112 such that a desired tension can be placed on the belt 58 and then the idler pulley 108 can be locked in place.

Figure 7:
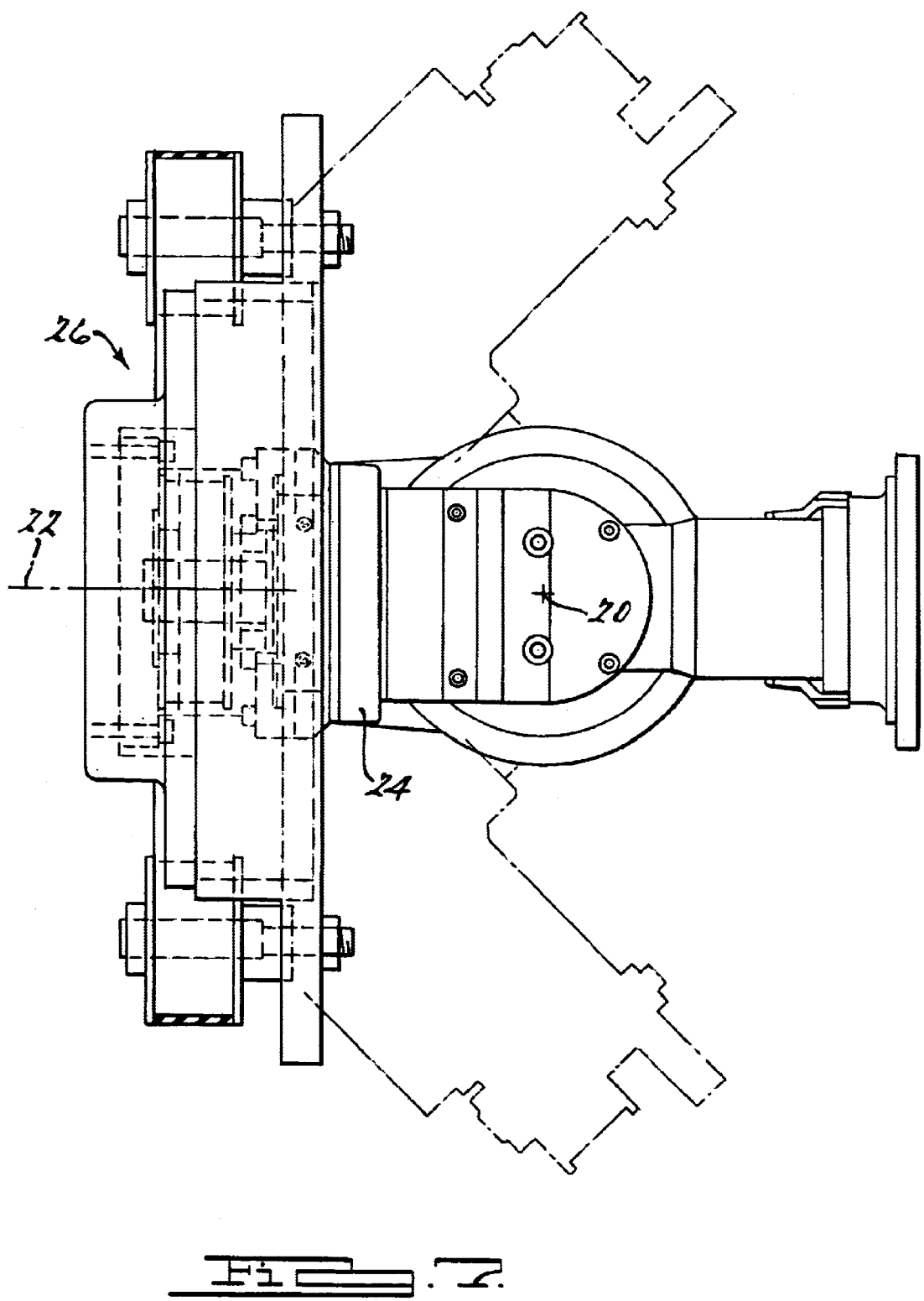
FIG. 7 is a side view of the end effector of the present invention coupled to the sixth axis mounting surface of the robot in FIG. 1.

Turning now to FIG. 7, a side view of the end effector 26 is illustrated with the wrist 24 of the robot 10 (FIG. 1). By vertically pivoting the wrist 24 about the fifth axis of movement 20, the end effector 26 can be moved in an arc. This is advantageous for positioning the objects of manufacture relative to buffing and/or polishing stations. Further, the end effector 26 can be rotated by rotating the wrist 24 about the sixth axis of movement 22.

Referring now collectively to all the FIGS. 1–7, in operation, the robot 10 is programmed to position the end effector 26 at a loading station. An operator loads the wheels 60 and 90 onto the first and second spindles 36 and 38 respectively. By using the locating members 70 and 100, the wheels 60 and 90 are commonly aligned. Thereafter, the robot 10 positions the wheels 60 and 90 adjacent select buffers. The servo-motor 42 rotates the first spindle 36 and wheel 60 by way of the gear box 40. The rotation of the spindle 36 is transferred to the second spindle 38 by way of the driving pulley 56, belt 58, and driven pulley 52. Since the first and second spindles 36 and 38 are interconnected by the belt 58, the rotation of the wheels 60 and 90 is synchronized. After polishing and/or buffing, the wheels 60 and 90 are removed.

Figure 8:
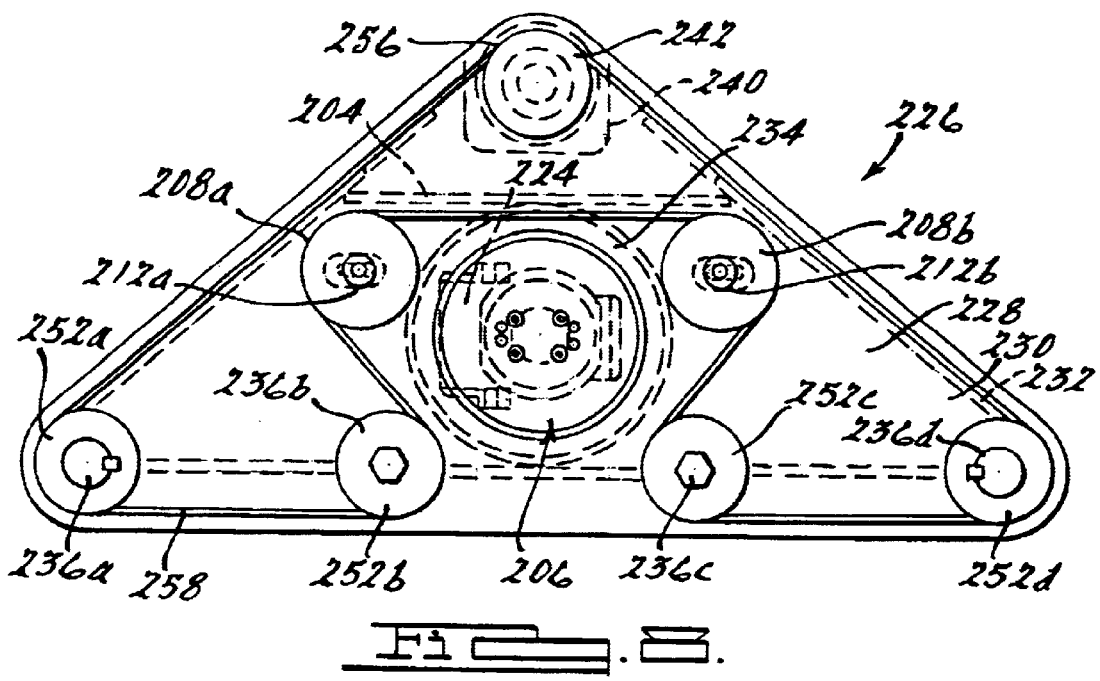
FIG. 8 is a plan view of a second embodiment multi-spindle end effector of the present invention.
Figure 9:
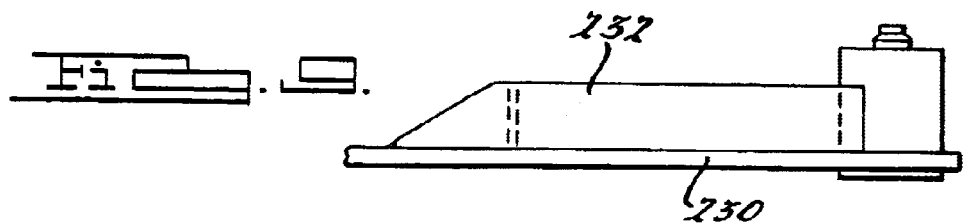
FIG. 9 is a side view of the multi-spindle end effector of FIG. 8.
Figure 10:
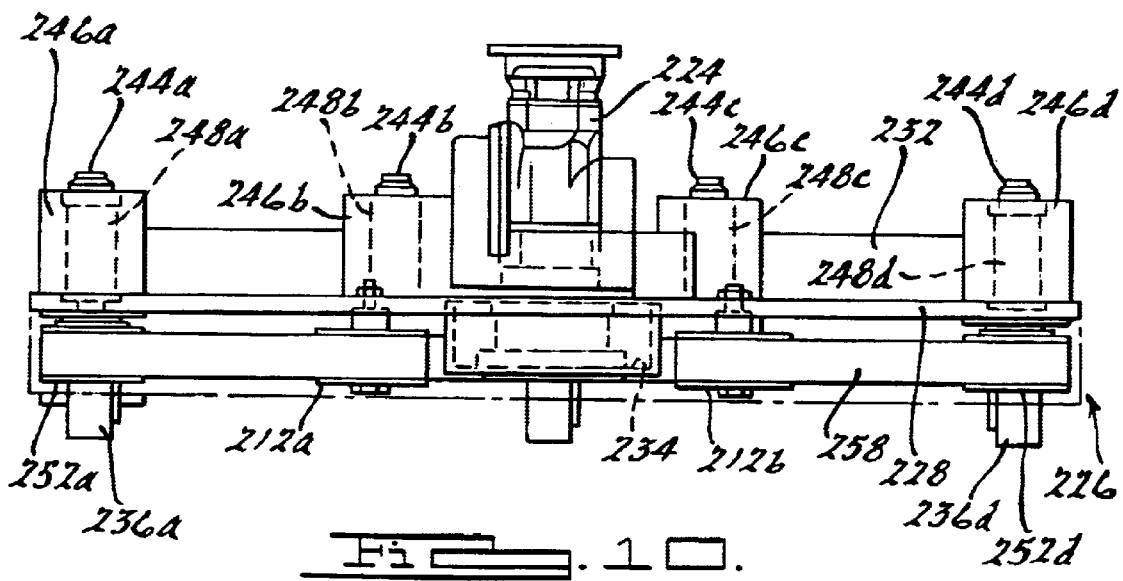
FIG. 10 is a bottom view of the multi-spindle end effector of FIG. 8.

Turning now to FIGS. 8–10 a second embodiment end effector according to the present invention is illustrated. Whereas the first embodiment of FIGS. 2–7 is particularly tailored to accommodate two objects to be rotated, the second embodiment is particularly tailored to accommodate four objects to be rotated.

The second embodiment end effector assembly 226 includes a plate housing 228 which is preferably formed as an aluminum weldment to minimize weight without sacrificing strength. As most clearly illustrate in FIG. 9, the plate housing 228 includes a base 230 surrounded by an integrally formed annular rib 232. The annular rib 232 stiffens the plate housing 228 while minimizing additional weight.

The base 230 includes a centralized portion 234 where the end effector 226 is fixedly secured, e.g., bolted, to the wrist 224. If desired, the portion 234 may be recessed relative to the base 230 to position the center of gravity of the end effector 226 axially away from the distal end of the wrist 224. This may save wear and tear on the robot 10 (FIG. 1).

The plate housing 228 rotatably supports a plurality of objects to be rotated (not shown) by way of a plurality of laterally projecting spindles 236a–d. The spindles 236a–d are preferably distributed along a common edge of the plate housing 228. The spindles 236a–d are preferably formed of aluminum to minimize weight without sacrificing strength.

The spindles 236a–d preferably project parallel to one another and are spaced apart by a sufficient amount to ensure clearance of the objects of manufacture to be mounted thereto. For example, this embodiment of the present invention can rotatably support four of vehicle wheels having diameters ranging from fourteen to twenty-six inches.

A gear box 240 is mounted to the plate housing 228. A servo-motor 242 is drivingly connected through a gear box 240 to a driving pulley 256. Rotation of the drive shaft of the servo-motor 242 is transferred through the gear box 240 to the driving pulley 256. The servo-motor 242 provides a seventh axis of rotation for the robot 10 (FIG. 1).

To minimize the weight extending beyond the end of the wrist 224, the servo-motor 242 preferably extends opposite the driving pulley 256 relative to the plate housing 28. Although other motors may be suitable for use in this embodiment, it is presently preferred to employ a Fanuc Alpha 6/3000 motor. A 1.9 HP version of this motor preferably includes a straight drive shaft and a brake and has a speed of up to 3000 RPMs. The motor 242 is controllable to start and stop, index, "free wheel", or reverse the objects coupled thereto.

The gear box 240 reduces the RPMs of the motor 242 transferred to the driving pulley 256. While different articles of manufacture require different RPMs depending on their final processing needs, it is presently preferred to reduce the RPMs of the driving pulley 256 to a range of between 0 and 50 RPMs. Although other gear boxes may be suitable for use herein, it is presently preferred to employ an Alpha Gear TP 050 Gearhead reducer. Variant 1 of this two stage gearbox preferably has a reduction ratio of about 61:1.

The spindles 236a–d are rotatably supported relative to the plate housing 228 by a plurality of spindle housings 244a–d. To minimize the weight extending beyond the end of the wrist 224, the spindle housings 244a–d preferably extend opposite the spindles 236 relative to the plate housing 228. Each of the spindle housings 244a–d includes a shroud 246 and a shaft 248.

A driven pulley 252 (described below) is non-rotatably secured, e.g., splined, to each of the shafts 248. A driving pulley 256 is non-rotatably connected, e.g., splined, to the motor 242 by way of the gear box 240. A synchronizer in the form of a timing belt 258 meshingly engages the driving pulley 256 and driven pulleys 252 such that they are interconnected. The belt 258 preferably consists of rubber and includes teeth distributed thereabout.

The belt 258 transfers the rotation of the driving pulley 256 by the motor 242 (and gear box 240) to the spindles 236a–d at a one-to-one ratio such that the rotation of the spindles 236a–d, as well as the objects of manufacture mounted thereto, is matched. To save weight, the driving pulley 256 and driven pulleys 252 are preferably formed of aluminum.

An object of manufacture such as the aluminum wheels of the first embodiment are non-rotatably connected to each of the spindles 236. For clarity, these objects of manufacture are not illustrated in FIGS. 8–10. Nonetheless, one skilled in the art will readily appreciate that they are preferably coupled thereto as described above. When mounted, each wheel adopts a preselected orientation when mounted to the end effector 226.

As best seen in FIG. 8, the plate housing 228 is generally shaped as a triangle and may include one or more elongated ribs 204 for added strength. The plate housing 228 also includes a plurality of mounting holes, generally shown at 206 in the portion 234 for accommodating fasteners such as bolts to secure the end effector 226 to the wrist 224. The wrist 224 will generally have a pre-selected bolt pattern to which the mounting holes 206 are designed to match.

As shown in FIGS. 8–10, a plurality of idler pulleys 208a and b are rotatably and slidably separately mounted to a plurality of slots 212a and b formed in the base 230 of the end effector 226. By selectively positioning the idler pulleys 208a and b along each respective slots 212a and b, the tension of the belt 258, which synchronizes the rotation of the driven pulleys 252a–d, is controlled. Maintaining proper tensioning on the belt 258 prevents belt slippage to ensure that the objects to be rotated rotate in phase. As one skilled in the art will appreciate, the idler pulleys 108a and b are preferably constructed as described above.

Figure 11:
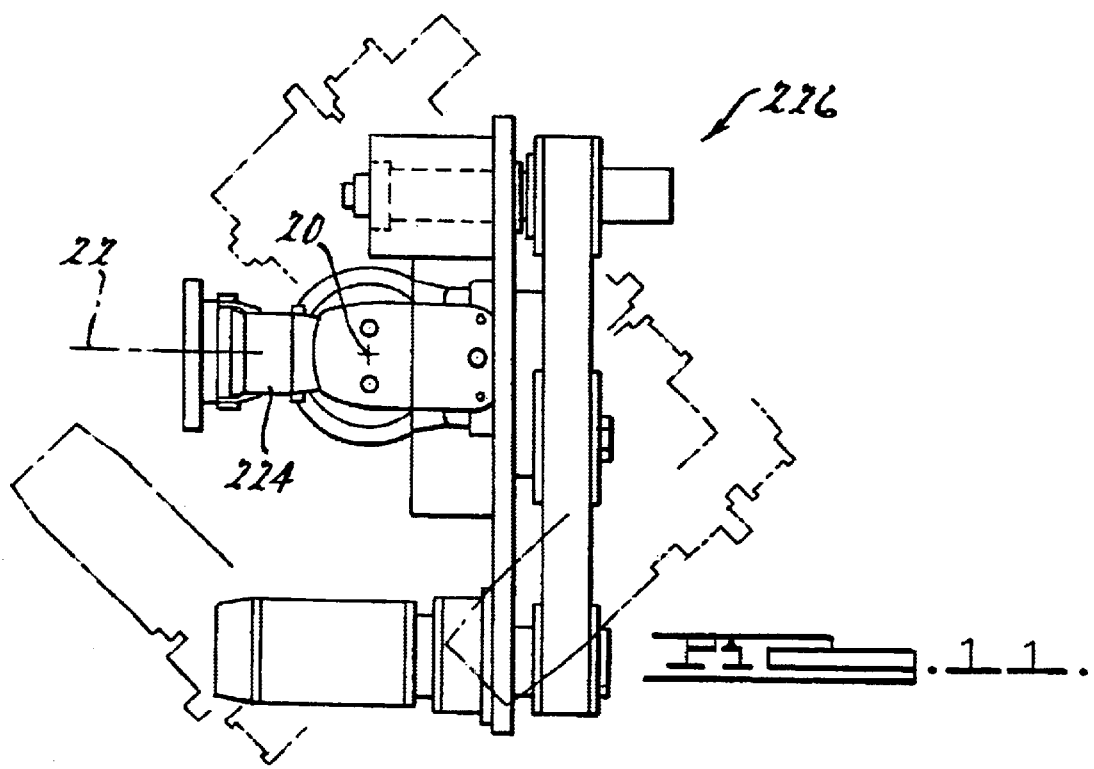
FIG. 11 is a side view of the multi-spindle end effector of FIG. 8 coupled to the sixth axis mounting surface of the robot in FIG. 1.

Turning now to FIG. 11, a side view of the end effector 226 is illustrated with the wrist 224 of the robot 10 (FIG. 1). By vertically pivoting the wrist 224 about the fifth axis of movement 20, the end effector 226 can be moved in an arc. This is advantageous for positioning the objects of manufacture relative to buffing and/or polishing stations. Further, the end effector 226 can be rotated by rotating the wrist 224 about the sixth axis of movement 22.

Figure 12:
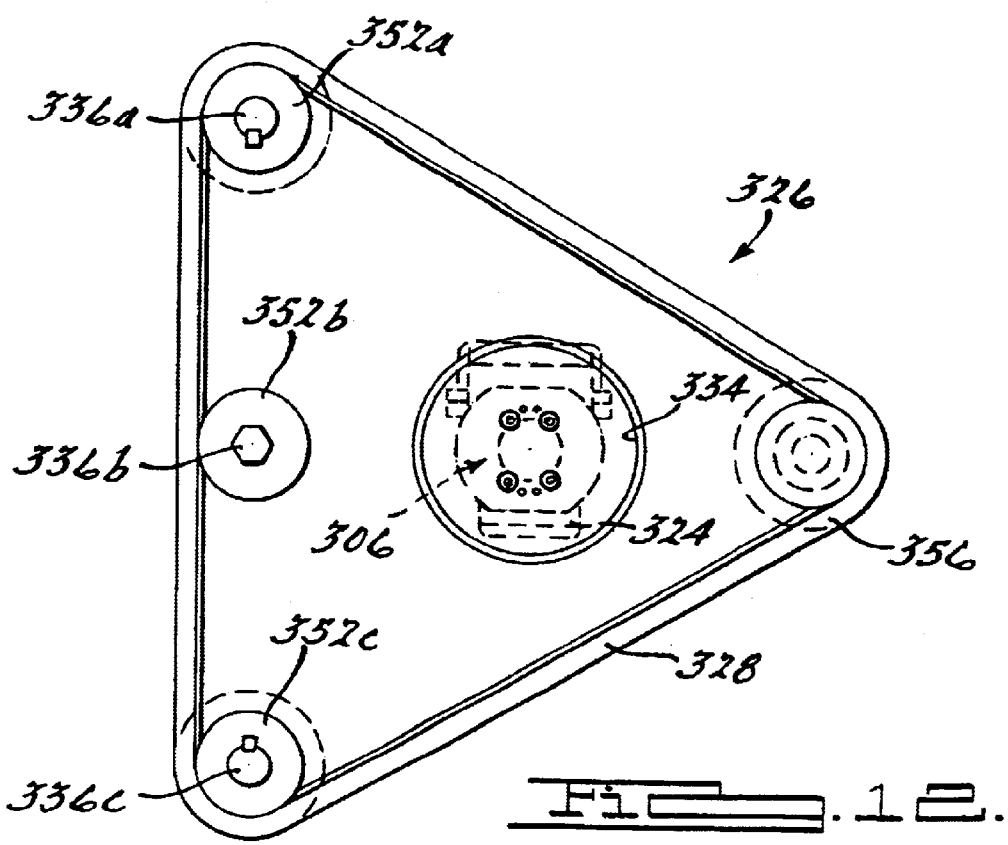
FIG. 12 is a plan view of a third embodiment multi-spindle end effector of the present invention.

Turning now to FIG. 12, a third embodiment of the present invention is illustrated. This embodiment is particularly tailored to accommodate three objects to be rotated. The third embodiment is similar in principle to the prior embodiments but includes three mounting positions for accommodating the objects to be rotated.

More particularly, the third embodiment end effector assembly 326 includes a plate housing 328 which is preferably formed as an aluminum weldment to minimize weight without sacrificing strength and may include ribs for added strength. The plate housing 328 includes a centralized portion 334 where the end effector 326 is fixedly secured, e.g., bolted, to the wrist 324. If desired, the portion 334 may be recessed position the center of gravity of the end effector 326 axially away from the distal end of the wrist 324. This may save wear and tear on the robot 10 (FIG. 1).

The plate housing 328 rotatably supports a plurality of objects to be rotated by way of a plurality of spindles 336a–c. The spindles 336a–d are preferably distributed along a common edge of the plate housing 328 and are coupled to spindle housings as described above. The spindles 336a–d preferably project parallel to one another and are spaced apart by a sufficient amount to ensure clearance of the objects of manufacture to be mounted thereto. For example, this embodiment of the present invention can rotatably support three vehicle wheels having diameters ranging from fourteen to twenty-six inches.

A driving pulley 356 is rotatably mounted to the plate housing 328 and is operably coupled to a gear box and servo motor as described above. A driven pulley 352 is non-rotatably secured, e.g., splined, to each of the spindles 336a–c. A synchronizer in the form of a timing belt (not shown) meshingly engages the driving pulley 356 and driven pulleys 352 such that they are interconnected.

The belt transfers the rotation of the driving pulley 356 by the motor and gear box to the spindles 336a–c at a one-to-one ratio such that the rotation of the spindles 336a–d, as well as the objects of manufacture mounted thereto, is matched. An object of manufacture such as the aluminum wheels of the first embodiment are non-rotatably connected to each of the spindles 336. For clarity, these objects of manufacture are not illustrated in FIG. 11.

The plate housing 328 is generally shaped as a triangle and includes a plurality of mounting holes, generally shown at 306, in the portion 334 for accommodating fasteners such as bolts to secure the end effector 326 to the wrist 324. If desired, one or more idler pulleys (not shown) may be rotatably and slidably separately mounted to a the plate housing 328. By selectively positioning such idler pulleys relative to the spindles 336a–c, the tension of the belt, which synchronizes the rotation of the driven pulleys 352, is controlled. Maintaining proper tensioning on the belt prevents belt slippage to ensure that the objects to be rotated rotate in phase.

Turning now to FIG. 13, a fourth embodiment of the present invention is illustrated. This embodiment is particularly tailored to accommodate five objects to be rotated. The fourth embodiment is identical in principle to the prior embodiments but includes five mounting positions for accommodating the objects to be rotated.

More particularly, the fourth embodiment end effector assembly 426 includes a plate housing 428. The plate housing 428 includes a centralized portion 434 where the end effector 426 is fixedly secured, e.g., bolted, to the wrist 424. The plate housing 428 rotatably supports a plurality of objects to be rotated by way of a plurality of spindles 436a–e.

The spindles 436a–e are preferably distributed along a common edge of the plate housing 428 and are coupled to spindle housings as described above. The spindles 436a–e preferably project parallel to one another and are spaced apart by a sufficient amount to ensure clearance of the objects of manufacture to be mounted thereto. For example, this embodiment of the present invention can rotatably support five vehicle wheels having diameters ranging from fourteen to twenty-six inches.

A driving pulley 456 is rotatably mounted to the plate housing 428 and is operably coupled to a gear box and servo motor as described above. A driven pulley 452 is non-rotatably secured, e.g., splined, to each of the spindles 436a–e. A synchronizer in the form of a timing belt (not shown) meshingly engages the driving pulley 456 and driven pulleys 452 such that they are interconnected. The belt transfers the rotation of the driving pulley 456 by the motor and gear box to the spindles 436a–e at a one-to-one ratio such that the rotation of the spindles 436a–e, as well as the objects of manufacture mounted thereto, is matched.

The plate housing 428 is generally shaped as a triangle and includes a plurality of mounting holes, generally shown at 406, in the portion 434 for accommodating fasteners such as bolts to secure the end effector 426 to the wrist 424. If desired, one or more idler pulleys (not shown) may be rotatably and slidably separately mounted to a the plate housing 428. By selectively positioning such idler pulleys relative to the spindles 436a–e, the tension of the belt, which synchronizes the rotation of the driven pulleys 452, is controlled. Maintaining proper tensioning on the belt prevents belt slippage to ensure that the objects to be rotated rotate in phase.

Turning now to FIG. 14, a fifth embodiment of the present invention is illustrated. This embodiment is particularly tailored to accommodate six objects to be rotated. The fifth embodiment is identical in principle to the prior embodiments but includes six mounting positions for accommodating the objects to be rotated.

More particularly, the fifth embodiment end effector assembly 526 includes a plate housing 528. The plate housing 528 includes a centralized portion 534 where the end effector 526 is fixedly secured, e.g., bolted, to the wrist 524. The plate housing 528 rotatably supports a plurality of objects to be rotated by way of a plurality of spindles 536a–f.

The spindles 536a–f are preferably distributed along a common edge of the plate housing 528 and are coupled to spindle housings as described above. The spindles 536a–f preferably project parallel to one another and are spaced apart by a sufficient amount to ensure clearance of the objects of manufacture to be mounted thereto. For example, this embodiment of the present invention can rotatably support six vehicle wheels having diameters ranging from fourteen to twenty-six inches.

A driving pulley 556 is rotatably mounted to the plate housing 528 and is operably coupled to a gear box and servo motor as described above. A driven pulley 552 is non-rotatably secured, e.g., splined, to each of the spindles 536a–f. A synchronizer in the form of a timing belt (not shown) meshingly engages the driving pulley 556 and driven pulleys 552 such that they are interconnected. The belt transfers the rotation of the driving pulley 556 by the motor and gear box to the spindles 536a–f at a one-to-one ratio such that the rotation of the spindles 536a–f, as well as the objects of manufacture mounted thereto, is matched.

The plate housing 528 is generally shaped as a triangle and includes a plurality of mounting holes, generally shown at 506, in the portion 534 for accommodating fasteners such as bolts to secure the end effector 526 to the wrist 524. If desired, one or more idler pulleys (not shown) may be rotatably and slidably separately mounted to a the plate housing 528. By selectively positioning such idler pulleys relative to the spindles 536a–f, the tension of the belt, which synchronizes the rotation of the driven pulleys 552, is controlled. Maintaining proper tensioning on the belt prevents belt slippage to ensure that the objects to be rotated rotate in phase.

Turning now to FIG. 15, a sixth embodiment of the present invention is illustrated. This embodiment is particularly tailored to accommodate seven objects to be rotated. The sixth embodiment is identical in principle to the prior embodiments but includes seven mounting positions for accommodating the objects to be rotated.

More particularly, the sixth embodiment end effector assembly 626 includes a plate housing 628. The plate housing 628 includes a centralized portion 634 where the end effector 626 is fixedly secured, e.g., bolted, to the wrist 624. The plate housing 628 rotatably supports a plurality of objects to be rotated by way of a plurality of spindles 636a–g.

The spindles 636a–g are preferably distributed along a common edge of the plate housing 628 and are coupled to spindle housings as described above. The spindles 636a–g preferably project parallel to one another and are spaced apart by a sufficient amount to ensure clearance of the objects of manufacture to be mounted thereto. For example, this embodiment of the present invention can rotatably support seven vehicle wheels having diameters ranging from fourteen to twenty-six inches.

A driving pulley 656 is rotatably mounted to the plate housing 628 and is operably coupled to a gear box and servo motor as described above. A driven pulley 652 is non-rotatably secured, e.g., splined, to each of the spindles 636a–g. A synchronizer in the form of a timing belt (not shown) meshingly engages the driving pulley 656 and driven pulleys 652 such that they are interconnected. The belt transfers the rotation of the driving pulley 656 by the motor and gear box to the spindles 636a–g at a one-to-one ratio such that the rotation of the spindles 636a–g, as well as the objects of manufacture mounted thereto, is matched.

The plate housing 628 is generally shaped as a triangle and includes a plurality of mounting holes, generally shown at 606, in the portion 634 for accommodating fasteners such as bolts to secure the end effector 626 to the wrist 624. If desired, one or more idler pulleys (not shown) may be rotatably and slidably separately mounted to a the plate housing 628. By selectively positioning such idler pulleys relative to the spindles 636a–g, the tension of the belt, which synchronizes the rotation of the driven pulleys 652, is controlled. Maintaining proper tensioning on the belt prevents belt slippage to ensure that the objects to be rotated rotate in phase.

Thus, an end effector is provided for a six axis robot which accommodates a plurality of objects to be rotated. The end effector interconnects each object to be rotated such that they are synchronized and indexable as a unit. Advantageously, multiple objects of manufacture can be simultaneously processed with the end effector of the present invention.

The description of the invention is merely exemplary in nature and, thus, variations that do not depart from the gist of the invention are intended to be within the scope of the invention. Such variations are not to be regarded as a departure from the spirit and scope of the invention. For example, the particular geometry of the mounting plate can be varied to accommodate the objects to be rotated in a modified distribution.

What is claimed is:

1. An end effector for a multiple axis robot comprising:
   a plate housing adapted to mount to said robot;
   a plurality of spindles rotatably mounted on said plate housing;
   a motor drivingly engaging at least one of said spindles; and
   a synchronizer interconnecting said spindles;
   wherein said plate housing includes a base having a recessed mounting portion adapted to connect to a mounting surface of said robot, said recessed mounting portion selectively positioning a center of gravity of said end effector relative to said mounting surface of said robot.

2. The end effector of claim 1, wherein the plate housing further comprises:
   a base; and
   an annular rib extending essentially perpendicularly relative to said base.

3. The end effector of claim 1, further comprising a driving pulley interconnecting said motor and said at least one of said plurality of spindles by way of said synchronizer.

4. The end effector of claim 1, wherein said motor is mounted to said plate housing opposite said at least one of said plurality of spindles.

5. The end effector of claim 1, further comprising a spindle housing rotatably interconnecting another of said plurality of spindles to said plate housing.

6. The end effector of claim 5, wherein said spindle housing is mounted to said plate housing opposite said another of said plurality of spindles.

7. The end effector of claim 1, further comprising:
   a driving pulley fixedly secured to said at least one of said plurality of spindles; and
   a driven pulley fixedly secured to each of a remainder of said plurality of spindles;
   wherein said driving pulley and said driven pulley are interconnected by said synchronizer.

8. The end effector of claim 1, wherein said synchronizer further comprises a belt.

9. The end effector of claim 1, further comprising an indexing member coupled between each of said plurality of spindles and each object to be mounted to said spindles.

10. The end effector of claim 9, further comprising a locator plate interposed between each of said indexing members and each of said plurality of spindles, said locator plate having a configuration matching a pattern of said objects to be mounted.

11. An end effector for a multiple axis robot comprising:
a plate housing adapted to mount to said robot;
a plurality of spindles rotatably mounted on said plate housing and projecting substantially orthogonally away from said plate housing;
a motor mounted on said plate housing and drivingly engaging at least one of said spindles;
a synchronizer interconnecting said spindles; and
a wheel holder assembly secured between each wheel to be rotated and each of said plurality of spindles, said wheel holder assembly including:
a support arm coupled to said spindle;
an outwardly biased piston slidably coupled to said support arm and radially extending relative to said spindle; and
a moveable arm laterally extending from a free end of said piston and engaging said wheel.

12. The end effector of claim 1, further comprising at least one idler pulley rotatably and slidably mounted to said plate housing and tensionably engaging said synchronizer.

13. The end effector of claim 12, wherein said idler pulley further comprises:
a jam nut having a shaft;
a sleeve rotatably mounted on said shaft; and
a pulley wheel coupled to said sleeve, said sleeve engaging said synchronizer.

14. The end effector of claim 1, wherein said plurality of spindles are spaced apart along a common edge of said plate housing.

15. The end effector of claim 1, wherein said plurality of spindles are mounted at select corners of said plate housing.

16. An end effector for a multiple axis robot comprising:
a plate housing adapted to connect to a sixth axis mounting surface of said robot, said plate housing having a spindle mounting surface extending substantially parallel to said sixth axis mounting surface;
a plurality of spindles rotatably mounted to said spindle mounting surface of said plate housing and projecting substantially orthogonally away from said spindle mounting surface, said plurality of spindles adapted to support a plurality of objects for rotation relative to said plate housing;
a motor mounted to said plate housing opposite one of said plurality of spindles, said motor being operably connected to said one of said plurality of spindles;
a driving pulley coupled to said one of said plurality of spindles;
a belt engaging said driving pulley; and
at least one driven pulley mounted to another of said plurality of spindles and engaging said belt.

17. The end effector of claim 16 further comprising at least one idler pulley rotatably and slidably mounted to said spindle mounting surface of said housing plate and tensionably engaging said belt.

18. An apparatus comprising:
a six axis robot having a first mounting surface provided at a sixth axis of said six axis robot; and
an end effector mounted to said first mounting surface, said end effector including:
a base having a spindle mounting surface extending substantially parallel to said first mounting surface and a second mounting surface which is recessed relative to said spindle mounting surface and parallel thereto, said second mounting surface being mounted to said first mounting surface;
a plurality of spindles rotatably mounted to said spindle mounting surface of said base and extending substantially orthogonally away from said spindle mounting surface;
a motor mounted to said spindle mounting surface of said base opposite one of said plurality of spindles, said motor drivingly engaging said one of said plurality of spindles;
a spindle housing mounted to said spindle mounting surface of said base opposite another of said plurality of spindles, said spindle housing rotatably supporting said another of said plurality of spindles;
a driving pulley coupled to said one of said plurality of spindles;
a belt engaging said driving pulley;
a driven pulley mounted to said another of said plurality of spindles and engaging said belt; and
at least one idler pulley rotatably and slidably mounted to said spindle mounting surface of said base and tensionably engaging said belt.

19. The end effector of claim 16, wherein said plate housing includes a housing mounting surface formed at a central region of said spindle mounting surface for mounting said plate housing to said sixth axis mounting surface of said robot, said mounting surface being recessed relative to said spindle mounting surface to selectively position a center of gravity of said end effector relative to said sixth axis mounting surface of said robot.

* * * * *

UNITED STATES PATENT AND TRADEMARK OFFICE
CERTIFICATE OF CORRECTION

PATENT NO. : 6,638,139 B2
DATED : October 28, 2003
INVENTOR(S) : Glen A. Carlson, III It is certified that error appears in the above-identified patent and that said Letters Patent is hereby corrected as shown below:

Column 1,
Line 36, "manufacturer" should be -- manufacture --

Column 4,
Line 26, "complimentary" should be -- complementary --

Column 5,
Line 52, "illustrate" should be -- illustrated --.

Column 7,
Line 37, After "recessed" insert -- to --

Column 8,
Line 4, and 49, After "to" delete "a"

Column 9,
Line 26, After "to" delete "a"

Column 10,
Line 5, After "to" delete "a"

Signed and Sealed this

Twenty-second Day of June, 2004

JON W. DUDAS
*Acting Director of the United States Patent and Trademark Office*